United States Patent [19]

McCullough

[11] Patent Number: 4,896,857
[45] Date of Patent: Jan. 30, 1990

[54] VERNIER ADJUSTMENT SYSTEM FOR DIAL INDICATOR HOLDER

[76] Inventor: Harry McCullough, Rte. 1, Box 110-17C, Jacksonville, Ark. 72076

[21] Appl. No.: 296,944

[22] Filed: Jan. 17, 1989

[51] Int. Cl.⁴ .............................................. E04G 3/00
[52] U.S. Cl. .............................. 248/279; 248/DIG. 4; 248/904
[58] Field of Search ............... 248/276, 278, 284, 285, 248/286, 229, 282, 124, DIG. 4; 33/832

[56] References Cited

U.S. PATENT DOCUMENTS

| | | |
|---|---|---|
| D. 258,726 | 3/1981 | Leutz . |
| D. 259,770 | 7/1981 | Leutz . |
| 1,059,948 | 4/1913 | Neberle .......................... 248/DIG. 4 |
| 2,124,006 | 7/1938 | Parker ................................. 248/124 |
| 2,541,535 | 2/1951 | Neff ............................ 248/DIG. 4 |
| 2,601,965 | 7/1952 | Scalise ......................... 248/DIG. 4 |
| 2,635,345 | 4/1953 | Samborski ........................... 248/124 |
| 2,733,035 | 1/1956 | Rocheleau ........................... 248/286 |
| 2,880,515 | 4/1959 | Vice ................................. 248/124 |
| 2,940,783 | 6/1960 | Engelhardt ........................ 248/124 |
| 3,129,918 | 4/1964 | Bradley ............................ 248/276 |
| 3,442,478 | 5/1969 | Parapetti ...................... 248/231.7 |
| 3,531,867 | 10/1970 | Viollet . |
| 3,581,354 | 6/1971 | Vsiskin ............................ 248/229 |
| 3,858,836 | 1/1975 | Marcyan . |
| 4,208,157 | 6/1980 | Guarino ....................... 248/DIG. 4 |
| 4,411,402 | 10/1983 | Keller ................................. 248/284 |
| 4,750,699 | 6/1988 | Tingley ....................... 248/DIG. 4 |

Primary Examiner—Ramon O. Ramirez
Assistant Examiner—Robert A. Olson
Attorney, Agent, or Firm—Stephen D. Carver

[57] ABSTRACT

An "add-on" vernier adjustment device for retrofitting to machinist dial indicator holders for enhancing measurements. The device is installed upon the articulated, multi-link arm of the dial indicator holder, and by adjusting a single rotatable knob, vernier dial indicator adjustments are facilitated in response to holder arm pivoting. Partial disassembly and then reassembly of the holder's original equipment is necessary to properly fit the device to the holder for subsequent vernier control. A rigid, box-like body is pivotally associated with a first arm link and is secured to the arm by an adjustable screw. A saddle, operationally coupled between the device body and the arm, comprises a rigid, generally rectangular, slotted member which surrounds and slidably receives the second linkage member of the arm, which before and after device mounting is functionally pivoted to the first arm linkage. A control system unites the body and the saddle and includes a captivated knob fitted within an arcuate yoke integral with the device body. The knob receives a threaded link extending from the saddle, so that rotation of the knob generates a screw force which pivotally deflects the two arm linkages. Once the device body and the saddle are appropriately mounted, relative pivoting between the first and second arm linkages is achieved by rotating the yoke-mounted control knob, thereby facilitating vernier adjustments in the dial indicator gauge.

8 Claims, 3 Drawing Sheets

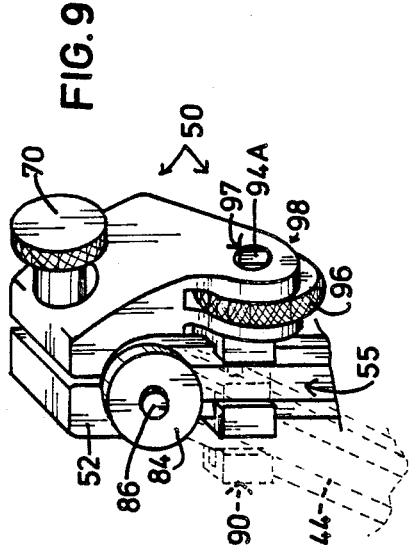
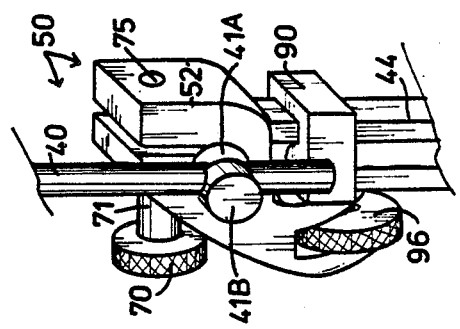
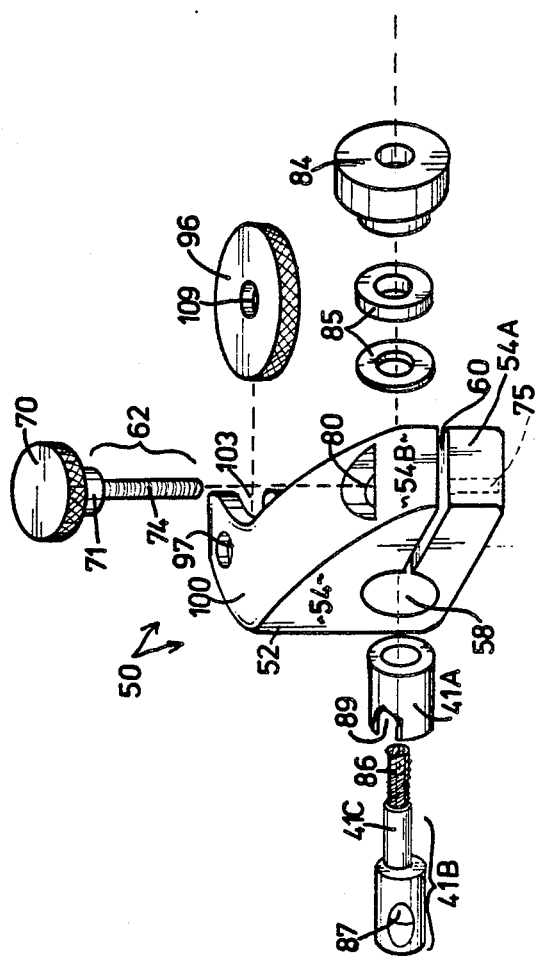
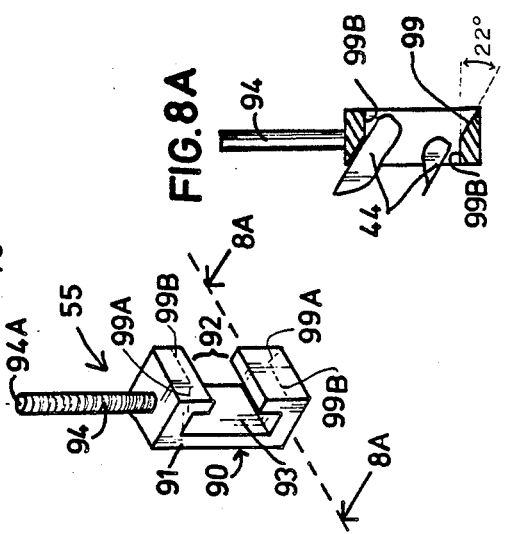

FIG. 11
FIG. 12
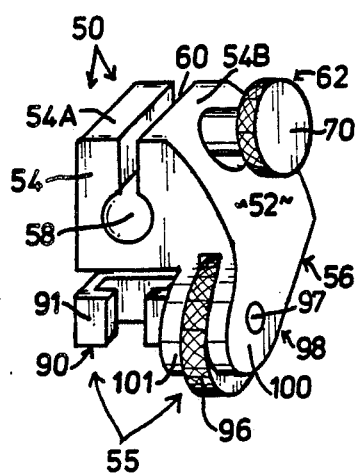
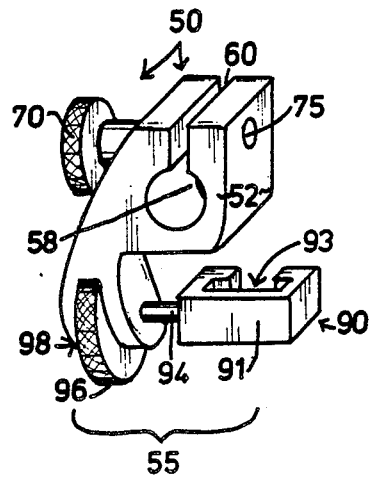
FIG. 13
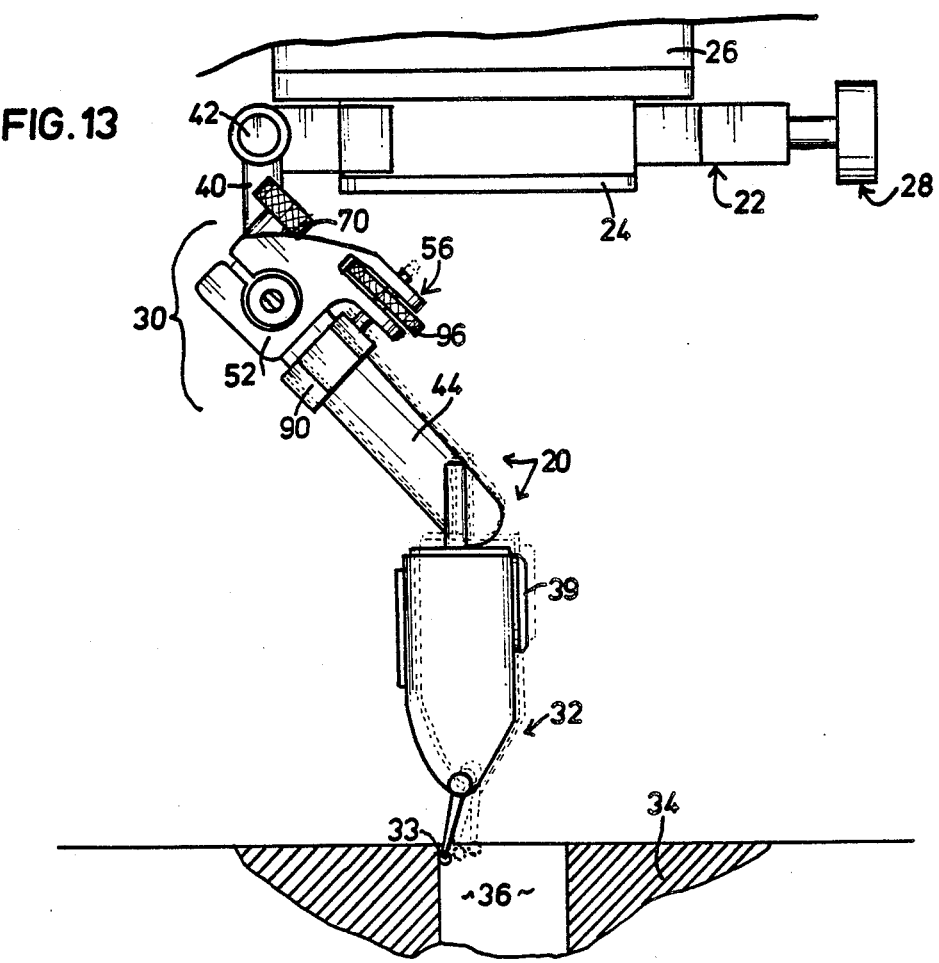

VERNIER ADJUSTMENT SYSTEM FOR DIAL INDICATOR HOLDER

BACKGROUND OF THE INVENTION

The present invention relates generally to dial indicator holders of the type used in setting up or adjusting machines such as milling equipment and the like. More particularly, the present invention relates to a device adapted to be retrofitted to conventional dial or gauge indicator holders for enabling precision vernier adjustments. The invention is believed to be best classified in U.S. Class 248, subclasses 278 or 284.

Dial or gauge indicator holders are well known in the prior art, and a basic dial indicator holder is disclosed in U.S. Pat. No. 3,442,478, issued to N. Parapetti on May 6, 1969. The adjustable dial indicator holder therein shown is adapted to be fitted to the machine tool quill or spindle assembly, and it includes an articulated arm comprising a pair of pivotally interconnected linkages which mount a conventional dial indicator gauge which facilitates dimensional measurement. The typical dial indicator gauge includes a downwardly projecting feeler portion adapted to directly contact the work piece.

The above mentioned device has met with relatively significant commercial success. It is sold under the trademark INDICOL, and it performs a variety of readings for the machinist without disturbing the setup of the quill or spindle of the machine. Machinists may advantageously employ the INDICOL brand dial indicator holders for concentricity positioning of the work piece relative to the spindle center line. Also, the INDICOL brand holder facilitates alignment of the edge of the work piece with longitudinal or transverse movement of the machine table, and it facilitates checking of the perpendicularity of the spindle center line relative to the surface of the table. The INDICOL unit has received wide spread recognition in the field, and its use on a daily basis by modern machinists operating devices such as Bridgeport Mills and the like has been well received. A number of other advantages and uses for the device are discussed in U.S. Pat. No. 3,442,478, which is herein incorporated by reference.

A typical INDICOL brand holder includes a C-shaped collar adapted to be fitted to the spindle, from which the articulated arm extends. The arm comprises a rigid, extension rod pivotally coupled to the C-clamp. The opposite end of the rod is pivotally secured to a rigid linkage which in turn terminates in a pivot coupled to the dial indicator gauge. Thus the unit may be manipulated into a variety of working positions by establishing relative pivoting of the various parts. While the tool may thus dispose the indicator gauge in a variety of positions to aid the machinist, I have found that precision adjustments are very difficult to achieve.

U.S. Pat. No. 4,858,836 issued to Marcyan on Jan. 7, 1975 discloses a bracket assembly which includes a similar articulated linkage associated with a lower dial type indicator gauge. Linkages of this type are also seen in the snap-on holder of U.S. Pat. No. 4,208,157 issued June 17, 1980. A variable length dial test indicator holder is seen in U.S. Pat. No. 4,750,699 issued June 14, 1988. The latter improved dial test indicator is adjustable in length, and because of the multiplicity of pivoted articulate members in the linkage, it may assume a wide variety of operational positions. U.S. Pat. Nos. 1,059,948, 2,940,783, and 3,531,867 are believed relevant to this field as well. U.S. Design patents showing arm-like linkages of this general type are seen in U.S. Pat. Nos. D-259,770 issued July 7, 1981, and D-258,726 issued Mar. 21, 1981.

However, with all known devices of which the INDICOL brand unit is the most familiar, minute or fine adjustments to the dial indicator position are very difficult to achieve. When manually manipulating the articulated arm linkages by pivoting adjacent arm members relative to one another, for example, what seem like small manual adjustments to arm position result in gross displacements of the indicator dial face. In other words, the indicator dial often goes off scale. To manipulate the linkage until a mid-range dial reading is achieved with the vernier indicator dial is difficult and time consuming. Therefore, I have proposed a device which may be retrofitted to conventional dial indicator holders of the type disclosed for enabling vernier adjustments to the dial position quickly and easily. While the best mode of the depicted device relates generally to the INDICOL brand unit discussed, its principals can equally be employed by retrofitting to any two articulated arm elements of the various known holder devices.

SUMMARY OF THE INVENTION

My invention comprises an "add-on" accessory device adapted to be retrofitted to conventional dial indicator holders for conveniently enhancing subsequent vernier or precision adjustments. The device is essentially captivated upon the articulated linkage of the conventional dial indicator holder, and by adjusting a single rotatable knob, vernier dial indicator adjustments are facilitated in response to concomitant holder arm pivoting. Partial disassembly and then reassembly of the holder's original equipment articulated arm members is necessary to properly fit the device to the holder for subsequent vernier control. Thus, prior to fitting my device to a dial indicator holder, the articulated holder arm must be disassembled by first uncoupling the original "rod" from the "link."

The instant device comprises a rigid, box-like body which is adapted to be coupled to the first link member of the articulated arm associated with the dial indicator holder. In the best mode the body includes an orifice which receives and captivates the original equipment sleeve and cap which originally couples the rod element to the linkage, as seen and discussed in U.S. Pat. No. 3,442,478, which is hereby incorporated by reference. The linkage is then recoupled to the rod at the other side of the body, so that the original pivotal relationship is maintained. A knurled knob may then be adjusted to tighten the body, which is sandwiched between the rod and the linkage.

A saddle is operationally coupled between the device body and the linkage. The saddle comprises a rigid, generally rectangular and box-like member adapted to surround and slidably receive the linkage member of the dial indicator holder arm. It is slidably fitted to the linkage after the linkage is uncoupled from the rod. A control system unites the body and the saddle. The body includes an integral, somewhat arcuate yoke which mounts the control system. Specifically, the yoke captivates a rotatable knob. The latter knob threadably receives a threaded link extending from the saddle, so that rotation of the knob generates a screw force which pivotally deflects the rod relative to the linkage. The knob rotatably captured within the yoke extends through the control system for threadable interconnection with the saddle, and thus rotation of the knob causes the saddle to move relative to the body. The body is stationary relative to the rod, but the pivotal interconnection between the rod and the linkage is preserved.

Thus, once the body and the saddle are appropriately mounted, relative deflection or pivoting between the first and second link members (i.e. "the rod" and the "linkage") is achieved to facilitate vernier adjustments in the dial indicator gauge which is pivotally secured to the articulated linkage in the manner provided by the original equipment.

Thus a fundamental object of the present invention is to provide an accessory device for use with dial indicator holders which facilitates vernier adjustments to the indicator gauge.

Similarly, it is an object of this invention to provide a system for dial indicator holders capable of making precision, vernier adjustments to the associated gauge or dial apparatus.

Yet another object of the present invention is to provide a vernier adjustment device of the character described, which may be quickly and easily retrofitted to existing dial indicator devices.

Similarly, it is an object of the present invention to readily provide easy precision vernier adjustments to machine tool users.

Another object of the present invention is to provide an add-on, accessory device for providing vernier adjustment which allows the articulated assembly to be disposed in a variety of positions, and which does not interfere with normal use of the indicator holder.

Yet another object is to provide a vernier system of the character described which facilitates vernier adjustments without disturbing the working tool or machine.

Another basic object is to provide a vernier device of the character described which may be relatively easily retrofitted to existing dial indicator holders without the use of precision tools or the necessity of special knowledge or skill.

Another important object of the present invention is to provide a vernier adaptation for dial indicator holder devices of the character described which can be mounted either "inside" or "outside" of the indicator holder device.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 8 is an enlarged, exploded isometric view of my device including certain original portions of the dial indicator articulated linkage to which it attaches, suggesting how retrofitting is accomplished;

FIG. 8A is an enlarged, fragmentary sectional view taken generally along line 8A—8A of FIG. 8;

FIG. 9 is an enlarged, fragmentary, front elevational view showing how pivoting is established with respect to the second holder linkage, with moved positions shown in dashed lines;

FIG. 10 is a rear perspective view, taken from a position generally from the rear of FIG. 9;

FIG. 11 is a front perspective view, similar to FIG. 9, showing the unmounted device in assembled form;

FIG. 12 is a rear perspective view of the unmounted device, taken from a position generally to the rear of FIG. 11; and, FIG. 13 is an enlarged, fragmentary, operational view of my device mounted upon a typical holder, showing how fine vernier adjustments are enabled.

DETAILED DESCRIPTION

Figure 1:
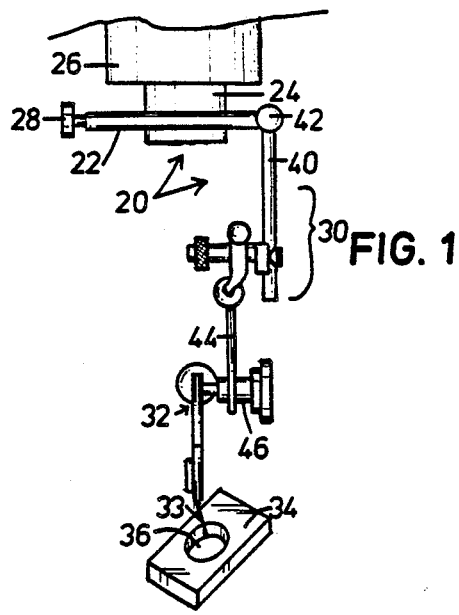
FIG. 1 is a fragmentary pictorial view showing the device operationally mounted upon a conventional dial indicator holder.
Figure 2:
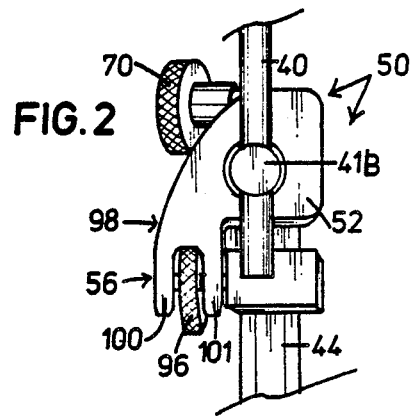
FIG. 2 is an enlarged, fragmentary, rear perspective view showing my adjustment device mounted upon the dial indicator holder.
Figure 3:
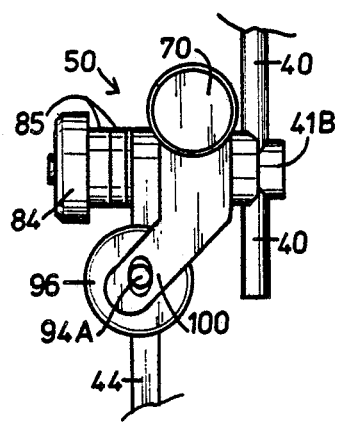
FIG. 3 is a fragmentary, top plan view of the device as shown in FIG. 2.
Figure 4:
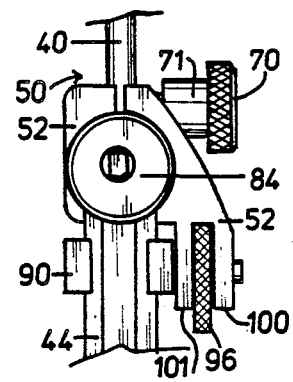
FIG. 4 is a fragmentary, front elevational view of the device of FIGS. 2 and 3.
Figure 5:
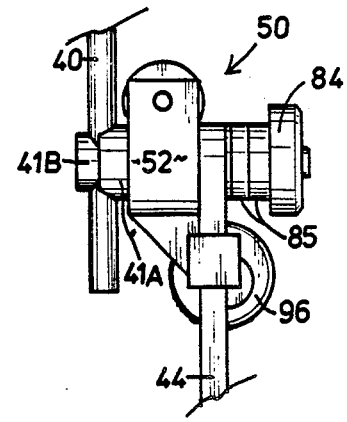
FIG. 5 is a fragmentary, bottom plan view thereof.
Figure 6:
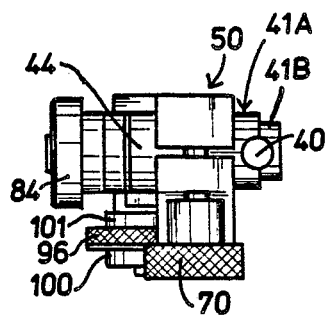
FIG. 6 is a left side, elevational view thereof.
Figure 7:
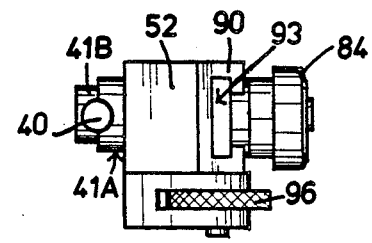
FIG. 7 is a right side elevational view thereof.

With initial reference now directed to FIGS. 1-13 of the appended drawings, a prior art dial indicator holder device constructed in accordance with the teachings of U.S. Pat. No. 3,442,478 which is hereby incorporated by reference, has been generally indicated by the reference numeral 20. As explained in the aforesaid patent, the indicator device 20 comprises a generally C-shaped clamp 22 adapted to be secured to a machine spindle 24 emanating from a quill 26 by tensioning a knurled screw adjustment 28. The indicator dial holder includes an elongated articulated arm, generally designated by the reference numeral 30, which extends between the C-clamp 22 and a lower dial indicator gauge 32. The dial-equipped gauge 32 is placed contact with a lower work piece 34 via a feeler probe 33. As best viewed in FIG. 13, the conventional gauge feeler 33 is illustrated disposed adjacent the periphery of an orifice 36 defined in the work piece 34, and concentricity may thus be measured. Dimensional measurements, as will be recognized by those skilled in the art, may be read from the front face 39 of the gauge 32.

While the articulated arm assembly 30 may comprise a plurality of individual elements coupled together, in the best mode it comprises two links. The illustrated holder of U.S. Pat. No. 3,442,478 comprises a rigid, generally cylindrical rod 40 pivotally coupled to the clamp 22 at a connection 42. The opposite end of rod 40 is normally pivotally coupled to a rigid link 44 which is in turn pivotally secured to the gauge 32 at pivot point 46. As explained in U.S. Pat. No. 3,442,478, rod 40 is pivoted with respect to clamp 22. Linkage 44 is pivotally secured to rod 40 with original equipment elements shown in FIG. 8 to be explained later. In turn, gauge 32 is pivotal with respect to linkage 44, so that a variety of varying articulations are possible. In order to install the instant apparatus, the normal pivot connection and assembly between rod 40 and 44 must first be unconnected so that the present apparatus may be installed as will hereinafter described.

With additional reference now concurrently directed to FIGS. 2-12, the reference numeral 50 broadly designates the device of the present invention. Once fitted upon the knuckle formed between the rod 40 and linkage 44 of articulated arm 30, the instant vernier enabling device 50 readily facilitates microscopic variations in the pivot of linkage 44 relative to rod 40 so as to provide a vernier adjustment of the gauge 32. The resultant very fine displacements are pictorially seen in dashed lines in FIG. 13. The device is essentially mounted to rod 40, and its saddle portion, to be explained later, controls linkage 44 to selectively force the pivoting thereof.

The vernier enabling device 50 comprises a rigid body 52 comprising a rigid, generally rectangular region 54 having an orifice 58 which is adapted to receive and be compressively coupled about rod 40's original equipment mounting sleeve 41A, which coaxially receives original equipment fastener screw 41B, by a screw 62 (FIG. 8). Parts 41A and 41B are not part of the invention. Orifice 58 is relieved by a narrow channel 60, and manually operable screw 62 urges opposite, body segments 54A and 54B together to capture rod sleeve 41A relative to body 52.

With reference to FIGS. 8 and 11-12, screw 62 comprises a knurled cap portion 70, an elongated threaded portion 74, and an intermediate sleeve portion 71. When cap 70 is tightened, shaft 74 will be received within orifice 75 so as to urge body portions 54A and 54B together about relief slot 60, thus compressing shaft mounting sleeve 41A. Sleeve 71 will be nested within notched region 80 for clearance. When properly installed, screw 41B will rotate within the sleeve 41A, shank portion 41C thereof in effect being journalled within sleeve 41A.

The gently arcuated yoke portion, integrally associated with body region 54 and broadly designated by the reference numeral 56, mounts a control system, broadly designated by the reference numeral 55, which comprises a saddle system 90 operated by a rotatable knob 96 captivated within yoke 56. Control system 55 forces pivotal deflection of the arm assembly 30 in response to knob rotation, as will hereinafter be explained.

In order to mount the body portion, rod 40 must first be disassociated from linkage 44, and thus its original nut 84 and spacers 85 must be removed from the threaded end 86 of the original mounting screw 41B (FIG. 8). Rod 40 is actually mounted by compression between an orifice 87 and a cradle-like mouth 89 (FIG. 8) defined in sleeve 41A, which are drawn together in response to tightening of knurled nut 84. Although the latter assembly is normally associated with the linkage 44 (FIG. 1) installation of the device 50 requires that the connection be temporarily broken. As will be appreciated from a comparison of FIGS. 3-5, the generally original equipment linkage 44 of the original dial indicator holder, will be sandwiched between body 52 and the spacers 85 when nut 84 (part of the original equipment) is thereafter again reassociated with threaded stem 86.

Saddle system 90 comprises a rigid saddle 91 of generally "C-shaped" cross section, which is slidably fitted about the linkage 44 of the original indicator holder. Saddle installation is accomplished prior to reassembly of nut 84 (FIG. 9) which pivotally re-relates the linkage 44 to the rod 40. Saddle 91 comprises a hollow interior slot 93 coextensive with a major portion of its length, and a reduced length relief slot 92. Linkage 44 is slidably received within saddle slot 93. In the best mode a 22 degree angle is internally machined at the "top" and "bottom" of slot 93 from the center line of the slot outward to the opposite sides to facilitate "up and down" movement of linkage 44. With reference to FIG. 8, the flat internal saddle surfaces 99B intersect the 22 degree angled internal surfaces 99A at the center line of the saddle 91. This construction facilitates axial movements of the linkage 44 relative to the saddle 91, which result since the pivot point of linkage 44 is established at 86 (FIG. 9), at a point spaced apart from the saddle 90. The latter geometry thus minimizes slack in the adjustment of knob 96 and accommodates for movement of linkage 44, to result in a mechanical movement relatively free from "play" or "slack."

An elongated, rigid, threaded stem 94 emanating from saddle 91 is adapted to be threadably received by an adjustment screw or knob 96, which receives rod end 94A and is rotatably captivated within a yoke portion of the body, between the spaced apart body yoke tabs 100 and 101. Tabs 100 and 101 are integral with the body and define a slot 103 (FIG. 8) which houses the rotatable adjustment knob 96. Threaded orifice 109 (FIG. 8) defined in nut 96 receives saddle stem 94.

It will thus be appreciated that as nut 96 is threadably rotated, saddle stem 94, which penetrates yoke tab orifices 97 (FIG. 8), may be drawn toward or away from the yoke to manipulate the saddle. Thus as nut 96 is rotated to displace the saddle, the finely varying positional variations seen in dashed lines in FIG. 13 may be achieved. As a consequence a variety of fine vernier mechanical adjustments to the gauge position may be achieved.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. In a dial indicator holder of the type comprising a fastener adapted to be coupled to a machining spindle or quill, an articulated arm projecting from said fastener and adapted to support a gauge and comprising at least a first link and a second link pivotally coupled together, the improvement comprising a device for enabling subsequent vernier adjustments to the holder, said device comprising:
   rigid body means adapted to be secured to said first link means for operationally mounting said device upon said dial indicator holder;
   saddle means adapted to be coupled to said second link means for restraining same;
   wherein the pivotal relationship between said first link means and said second link means is preserved after installation of said device; and,
   control means for at least slightly moving said saddle means relative to said body means to pivot said second link relative to said first link to produce vernier adjustments of said holder which will be indicated upon said gauge.

2. The device as defined in claim 1 wherein said control means comprises means for threadably coupling said saddle means to said body means.

3. The device as defined in claim 2 wherein said control means is captivated by said body means.

4. The device as defined in claim 3 wherein said body means comprises a yoke, said control means comprises a nut rotatably captivated by said yoke, and said control means comprises screw means extending between said nut and said saddle means, whereby rotation of said nut deflects said saddle means relative to said body means, thereby pivoting said second link means relative to said first link means.

5. The device as defined in claim 4 wherein said body means comprises a collar adapted to restrain said first link means, and screw means for manually tightening said collar to secure said device to said dial indicator holder.

6. A device adapted to be retro-fitted to a dial indicator holder of the type comprising a clamp or fastener adapted to be coupled to a machining spindle or quill, and an articulated arm adapted to support a gauge and comprising at least a first link and a second link pivotally coupled together, for enabling subsequent vernier adjustments to the dial indicator holder, said device comprising:
 rigid body means adapted to be secured to said first link for operationally mounting said device upon said dial indicator holder, said body means comprising a collar adapted to restrain said first link, means for tightening said collar to secure said device to said dial indicator holder, and a yoke;
 saddle means adapted to be coupled to said second link for restraining same;
 wherein the pivotal relationship between said first link and said second link is preserved after installation of said device;
 control means comprising a nut captivated within said yoke for at least slightly moving said saddle means relative to said body means to pivot said second link relative to said first link to produce vernier adjustments of said holder which will be indicated upon said gauge; and,
 said saddle means being threadably coupled to said control means by screw means extending between said nut and said saddle means, whereby rotation of said nut deflects said saddle means relative to said body means, thereby pivoting said second link relative to said first link.

7. The device as defined in claim 6 wherein said body means comprises a collar adapted to restrain said first link means, and screw means for manually tightening said collar to secure said device to said dial indicator holder.

8. For a dial indicator holder of the type comprising a clamp adapted to be coupled to a machining spindle or quill, and an articulated arm attached to the clamp terminating in a gauge, the arm comprising a first link and a second link pivotally coupled together, an accessory device adapted to be retro-fitted to said dial indicator holder for readily facilitating subsequent vernier adjustments, said device comprising:
 rigid body means adapted to be secured to said arm for operationally mounting said device upon said dial indicator holder, said body means comprising means for securing said first link and said second link to said body means wherein the pivotal relationship between said first link and said second link is preserved after installation of said device, a collar adapted to restrain said first link, means for tightening said collar to secure said device to said dial indicator holder, and a yoke;
 saddle means captivating said second link for restraining same; and,
 control means comprising a nut rotatably captivated within said yoke and threadably linked to said saddle means for at least slightly moving said saddle means relative to said body means to pivot said second link relative to said first link to produce vernier adjustments of said holder which will be indicated upon said gauge.

* * * * *